(12) United States Patent
Abraham et al.

(10) Patent No.: US 8,011,913 B2
(45) Date of Patent: Sep. 6, 2011

(54) METHOD OF MELT BLENDING CURABLE POLYMER COMPOSITIONS USING SILICONE HYDRIDES

(75) Inventors: Tonson Abraham, Strongsville, OH (US); Edward Blok, Wadsworth, OH (US); Kuo-Shein Shen, Copley, OH (US); Norman Glenn Barber, Norwalk, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 389 days.

(21) Appl. No.: 12/040,487

(22) Filed: Feb. 29, 2008

(65) Prior Publication Data
US 2009/0221753 A1 Sep. 3, 2009

(51) Int. Cl.
B29C 47/00 (2006.01)
B29C 35/02 (2006.01)
C08G 77/12 (2006.01)

(52) U.S. Cl. ............ 425/113; 425/131.1; 264/464; 264/477; 264/514; 528/31

(58) Field of Classification Search ............... 425/113, 425/131.1; 264/464, 477, 514
See application file for complete search history.

(56) References Cited

U.S. PATENT DOCUMENTS

| | | | |
|---|---|---|---|
| 4,046,930 A | 9/1977 | Johnson et al. | |
| 4,594,390 A * | 6/1986 | Abdou-Sabet et al. | 525/232 |
| 4,803,244 A * | 2/1989 | Umpleby | 525/105 |
| 5,051,478 A * | 9/1991 | Puydak et al. | 525/195 |
| 5,597,867 A * | 1/1997 | Tsujimoto et al. | 525/74 |
| 5,672,660 A | 9/1997 | Medsker et al. | |
| 5,936,028 A * | 8/1999 | Medsker et al. | 524/506 |
| 6,013,715 A * | 1/2000 | Gornowicz et al. | 524/492 |

(Continued)

OTHER PUBLICATIONS

Burton, Emma-Louise et al., "Reactive Grafting of Glycidyl Methacrylate onto Polypropylene," *Journal of Applied Polymer Science*, vol. 117, pp. 2707-2714 (2010).

(Continued)

*Primary Examiner* — Robert Loewe
(74) *Attorney, Agent, or Firm* — Kevin Faulkner

(57) ABSTRACT

Provided in one aspect is a method of melt blending comprising providing an extruder possessing addition points from a zero point to a 100 point the length of the extruder; adding at least one thermoplastic and at least one curable polymer at the zero to 10 point of the extruder; adding at least one silicone hydride at the 5 to 30 point of the extruder; adding at least one metal catalyst at the 20 to 60 point of the extruder, with the proviso that the metal catalyst is added at least 5 points farther down the extruder than the silicone hydride. Provided in another aspect is a hydrosilylation curative composition comprising a silicone hydride having the formula

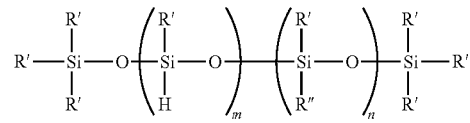

wherein H is hydrogen, and each R' is independently selected from hydrogen and $C_1$ to $C_{10}$ alkyl groups; R" is selected from $C_1$ to $C_{10}$ alkyl groups; n is an integer from 5 to 45; and m is an integer from 5 to 45.

9 Claims, 8 Drawing Sheets

U.S. PATENT DOCUMENTS

| | | | | |
|---|---|---|---|---|
| 6,015,858 A * | 1/2000 | Gornowicz | .................... | 524/545 |
| 6,093,760 A * | 7/2000 | Nishihara et al. | ............. | 524/145 |
| 6,147,160 A * | 11/2000 | Wang et al. | ................... | 525/106 |
| 6,150,464 A * | 11/2000 | Medsker et al. | .............. | 525/101 |
| 6,281,286 B1 * | 8/2001 | Chorvath et al. | ............. | 524/862 |
| 6,433,090 B1 * | 8/2002 | Ellul et al. | .................... | 525/191 |
| 6,451,915 B1 * | 9/2002 | Ellul et al. | .................... | 525/191 |
| 6,503,985 B1 * | 1/2003 | Ellul et al. | .................... | 525/191 |
| 6,610,786 B1 * | 8/2003 | Itoh et al. | ...................... | 525/191 |
| 6,759,487 B2 * | 7/2004 | Gornowicz et al. | ........... | 525/478 |
| 6,790,911 B2 * | 9/2004 | Perevosnik et al. | ........... | 525/191 |
| 7,173,092 B2 * | 2/2007 | Gornowicz et al. | ........... | 525/104 |
| 2002/0132914 A1 * | 9/2002 | Shudo | .......................... | 524/588 |
| 2005/0085591 A1 * | 4/2005 | Dozeman et al. | ............ | 525/192 |
| 2006/0293458 A1 * | 12/2006 | Chung et al. | .................. | 525/192 |
| 2007/0043172 A1 * | 2/2007 | Ellul et al. | .................... | 525/192 |
| 2007/0043177 A1 * | 2/2007 | Michie et al. | .................. | 526/65 |

OTHER PUBLICATIONS

Hewitt, Norman, "Compounding Precipitated Silica in Natural Rubber" *Compounding Precipitated Silica in Elastomers*, William Andrew Publishing, Chapter 2, pp. 25-30 (2007).

Jansen, Paulo et al., "The Use of EVA-Containing Mercapto Groups in Natural Rubber-EVA Blends. II. The Effect of Curing System on Mechanical and Thermal Properties of the Blends," *Journal of Applied Polymer Science*, vol. 61, pp. 591-598 (1996).

Jones, H.C. et al., "Reactions during Vulcanization I—Influence of Zinc and Lead on Rate of Cure of Stocks Accelerated with Tetramethylthiuram Monosulfide," *Industrial and Engineering Chemistry*, December, pp. 1467-1471 (1931).

Stephens, Howard L., "The Compounding and Vulcanization of Rubber," *Rubber Technology*, 3rd Edition, Chapman & Hall, pp. 20-30 (1995).

\* cited by examiner

METHOD OF MELT BLENDING CURABLE POLYMER COMPOSITIONS USING SILICONE HYDRIDES

FIELD OF THE INVENTION

Aspects of the present invention relate to methods for melt blending two or more polymers, wherein at least one polymer is curable, and relates more particularly to the formation of thermoplastic vulcanizates in melt blending devices wherein two separate components of a silicone hydride curative composition are added to the device at different points in order to effectuate ideal properties in the thermoplastic vulcanizate.

BACKGROUND OF THE INVENTION

The transition metal catalyzed addition of silicone hydrides to olefins is well known. The application of this reaction to the curing of polyolefinic rubbers for the preparation of thermoplastic elastomers by dynamic vulcanization is also well known. The bulk of the commercially available thermoplastic vulcanizates are produced by the dynamic vulcanization of EPDM (copolymer of ethylene, propylene, and a limited amount of a diene such as 5-ethylidene-2-norbornene) rubber in isotactic polypropylene.

In the dynamic vulcanization process, the thermoplastic, rubber, and paraffinic oil (which is miscible in all proportions with rubber and molten plastic) are intensively sheared in an extruder, above the melting temperature of the plastic, to form an intimate melt blend of the polymeric materials. The rubber is then selectively cured, without affecting the plastic phase, while shearing of the polymer melt blend is continued.

The high rubber content formulations that are necessary for the preparation of soft thermoplastic vulcanizates, have a rubber continuous/discreet phase morphology on melt mixing. On curing, the continuous rubber phase breaks up and disperses into a continuous molten thermoplastic phase as crosslinked particulate rubber. The molten TPV thus formed consists of oil-swollen crosslinked rubber particles that are contained in an oil solution of molten thermoplastic, polypropylene in a particular embodiment. On cooling, the melt solidifies by the crystallization of the polypropylene, and the oil rejected by the polypropylene crystals is absorbed into the amorphous polypropylene phase and into the particulate rubber. The final product morphology consists of oil-swollen, crosslinked particulate rubber that is contained in an oil-swollen continuous polypropylene matrix. The oil present reduces TPV melt viscosity, which is critical in facilitating TPV manufacture, fabricability, and in producing fabricated parts with a smooth surface, in addition to reducing product raw material cost. The presence of clay, talc or other such solid filler in the TPV formulation prevents blocking of the granulated rubber, and thus allows accurate metering of the clay and rubber blend into the extruder. Inclusion of clay in the TPV also reduces product raw material cost.

It is well known that silicone hydrides are the curatives of choice when EPDM rubber is dynamically vulcanized by hydrosilylation in polypropylene (U.S. Pat. No. 4,803,244), because these curatives allow a high enough rubber cure rate that causes the rubber to be essentially fully cured in about the 40-second cure time that is available in the process (U.S. Pat. No. 4,594,390).

It was later recognized that the sterically unhindered vinyl groups that are pendent to the rubber backbone in the copolymer of ethylene, propylene, and a limited amount of 5-vinyl-2-norbornene (i.e., EP(VNB)DM), are much more reactive in hydrosilylation than the pendent ethylidene groups of EP(ENB)DM rubber (U.S. Pat. No. 5,672,660). Thus the dynamic vulcanization of EP(VNB)DM in polypropylene by hydrosilylation could be achieved using a very low catalyst level (<20 ppm Pt°, based on the rubber content), in comparison with the case when EP(ENB)DM is dynamically vulcanized.

The preferred class of silicone hydride curatives described in U.S. Pat. No. 5,672,660 and in U.S. Pat. No. 6,150,464 is trimethylsilyl-terminated polymethylhydrosiloxanes, particularly when alkylated, as depicted in equation (1).

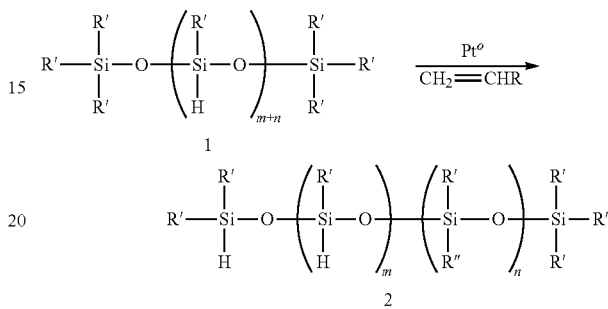

wherein R" in structure 2 is the $CH_2$=CHR group. In equation (1), the structure (1) refers to the silicone hydride prior to undergoing the alkylation reaction, and the structure (2) is the "alkylated" silicone hydride. When R" is a $C_4$ or greater, it is typically more rubber-reactive, as it's solubility in the rubber improves. The alkyl groups are chosen so as to allow miscibility of the rubber with the curative, which allows increased curing efficiency, provided the alkylation does not significantly reduce the active hydrogen atoms that are directly bound to the silicon atoms. The alkylation reaction itself (equation 1) is typically a platinum catalyzed hydrosilylation of an olefin with the silicone hydride. The alkylation reaction increases curative cost.

Colorable, non-hygroscopic TPVs can be obtained by the hydrosilylation cure of EP(VNB)DM, when dynamically vulcanized in polypropylene. Products with increased whiteness (high color "L" value) and color control during manufacture are highly desirable. The presence of zinc oxide and clay in the TPV allows a high color L value. Variations in process conditions such as above-normal temperatures can cause a decrease in product color L. In this invention, it has been discovered, unexpectedly, that product color L is sensitive to the injection location (along the extruder) of the silicone hydride curative and of the platinum catalyst.

Also, the inventors have found that unalkylated silicone hydride curatives (as in FIG. 2, structure 1) yield TPVs with increased color L over TPVs produced with alkylated silicone hydrides (such as in equation 1, structure 2). Furthermore, the unalkylated silicone hydrides, although immiscible with EP(VNB)DM rubber, have been found to be as efficient, if not modestly better TPV curatives, on a weight basis, than the rubber-miscible alkylated silicone hydrides. That is, the unalkylated silicone hydrides allow the preparation of TPVs with comparable, if not improved elastic recovery at 100° C. with other TPV physical properties, processability, and fabricated part appearance that match those of TPVs prepared with the alkylated silicone hydrides. These findings are contrary to the teachings in the art.

SUMMARY OF THE INVENTION

Provided in one aspect is a method of melt blending comprising (a) providing an extruder possessing addition points from a zero point to a 100 point the length of the extruder; (b) adding at least one thermoplastic and at least one curable polymer at the zero to 10 point of the extruder; (c) adding at least one silicone hydride at the 5 to 30 point of the extruder; (d) adding at least one metal catalyst at the 20 to 60 point of the extruder, with the proviso that the metal catalyst is added at least 5 points farther down the extruder than the silicone hydride; and (e) isolating a thermoplastic vulcanizate from the 90 to 100 point of the extruder.

Provided in another aspect is a curative composition comprising a silicone hydride having the formula

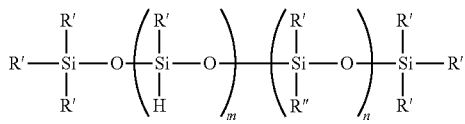

wherein H is hydrogen, and each R' is independently selected from hydrogen and $C_1$ to $C_{10}$ alkyl groups; R" is selected from $C_1$ to $C_{10}$ alkyl groups; n is an integer from 5 to 45; and m is an integer from 5 to 45.

As will be understood, the various features of these and other aspects of the invention can be combined with the various embodiments of the elements as described herein.

DESCRIPTION OF THE DRAWINGS OF THE INVENTION

FIGS. 3A and 2B is a graphical representation of the Color "a" as a function of addition point of the cure composition pairs in the extruder;

Figure 2A:
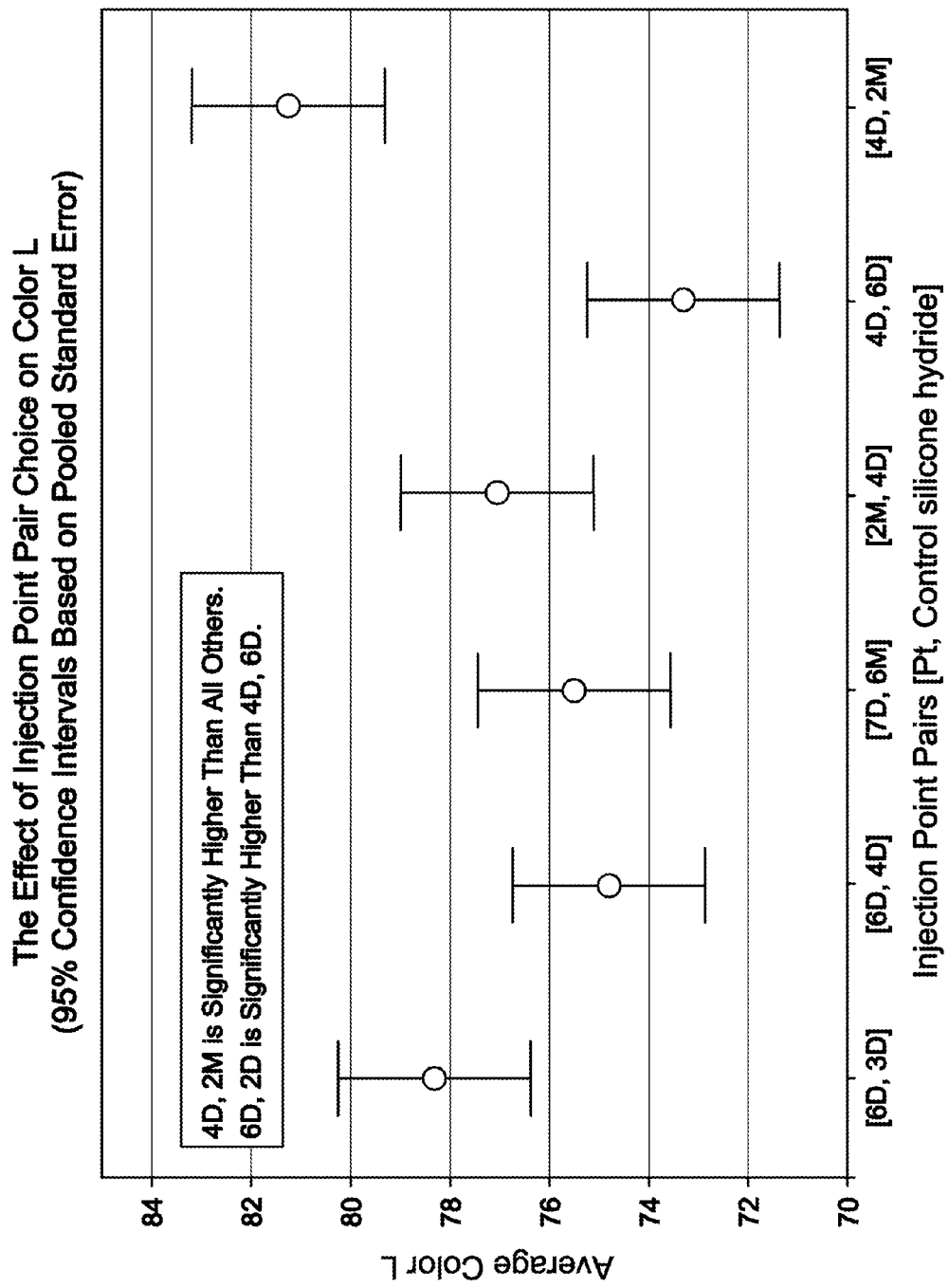
FIGS. 2A and 2B is a graphical representation of the Color "L" as a function of addition point of the cure composition pairs in the extruder.
Figure 2B:
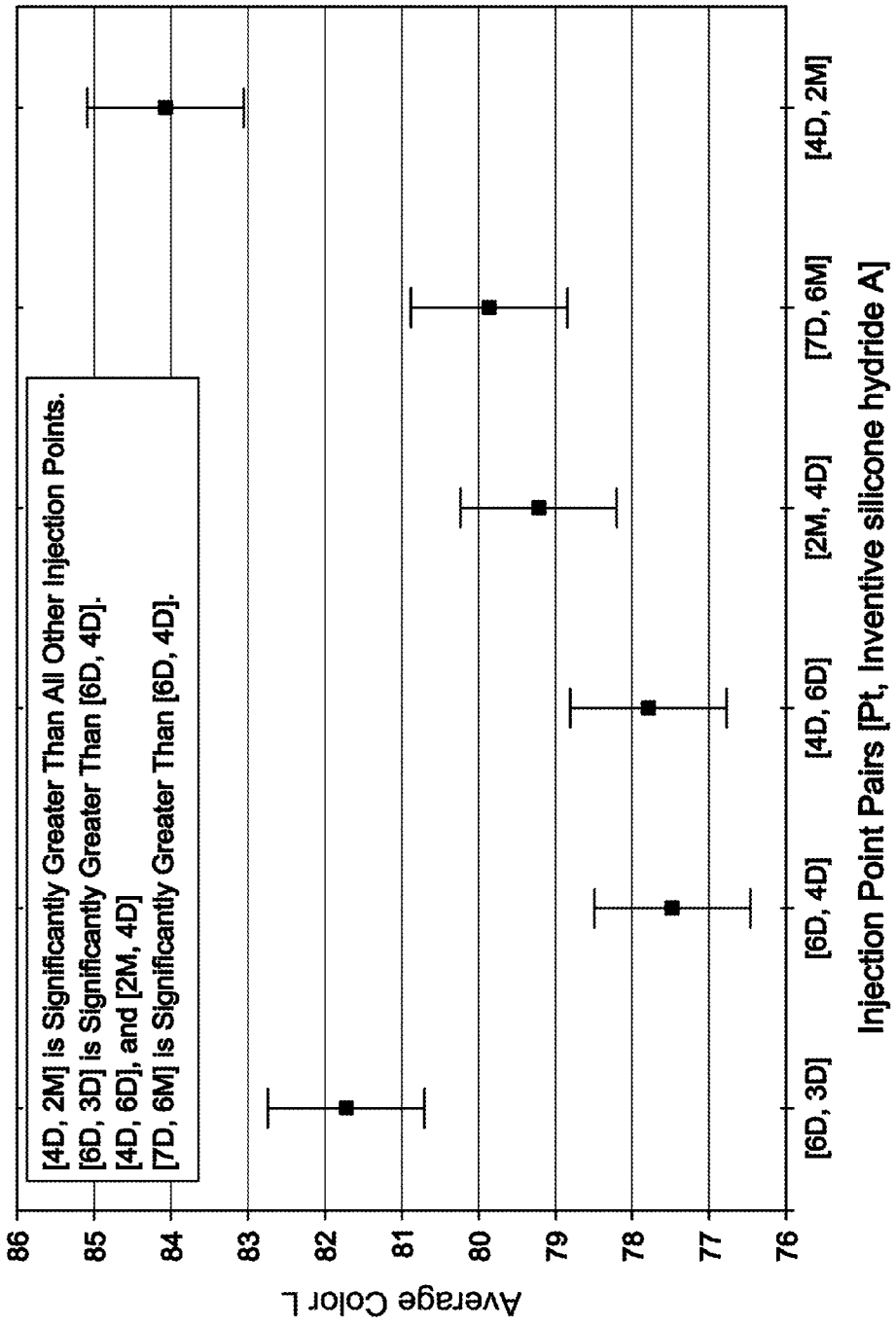
Figure 4A:
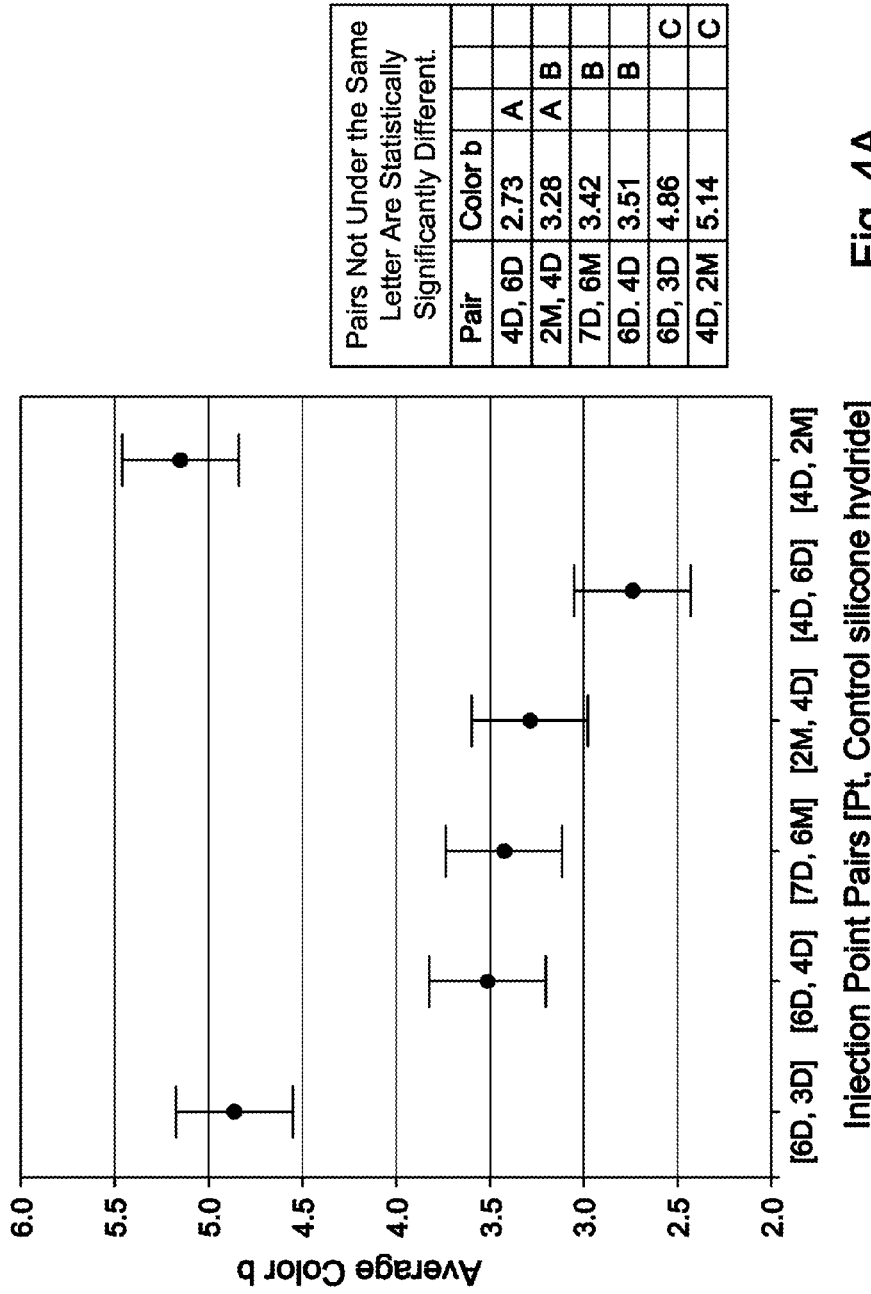
Figure 5:
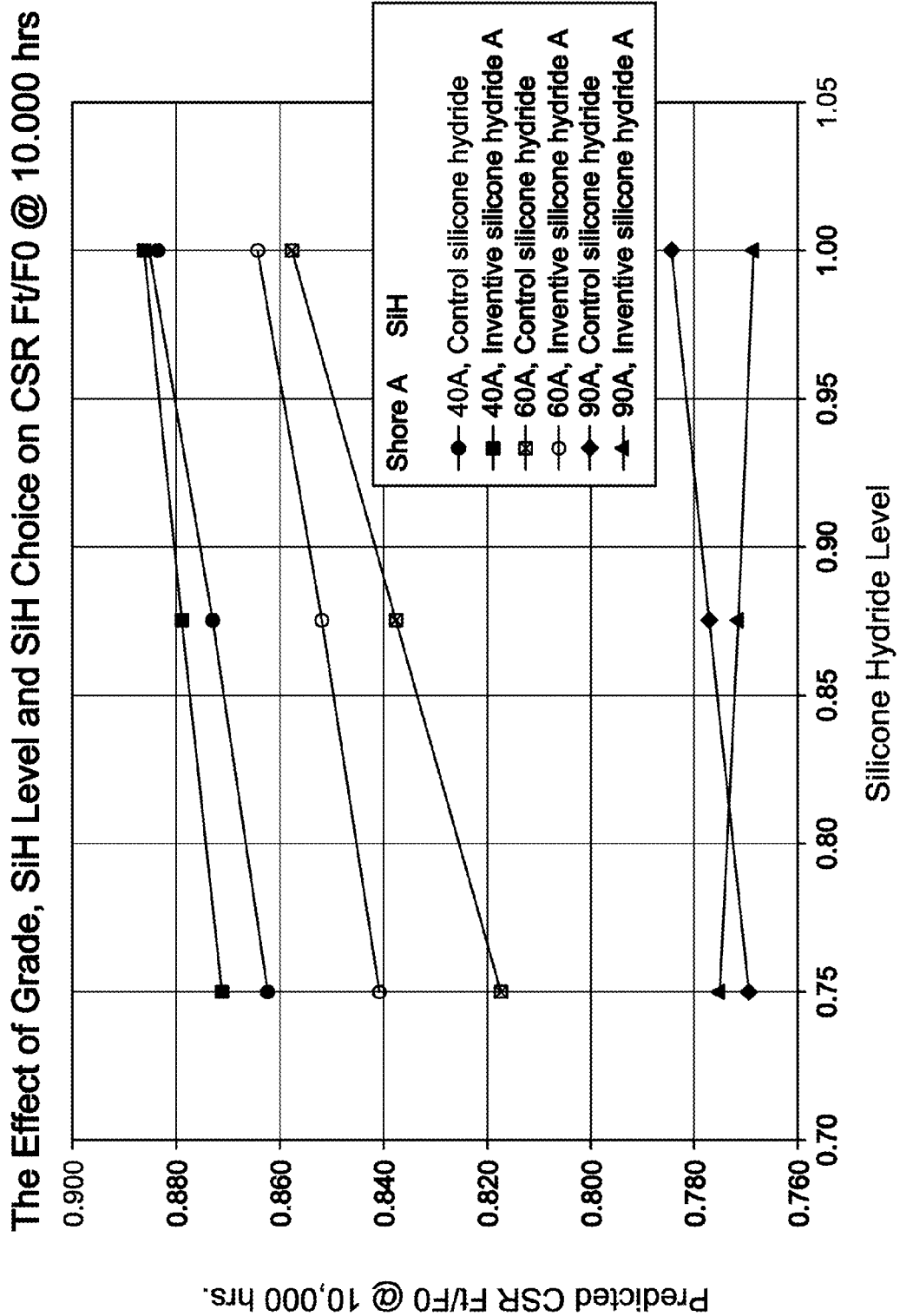

FIGS. 4A and 2B is a graphical representation of the Color "b" as a function of addition point of the cure composition pairs in the extruder; and FIG. 5 is a graphical representation of the silicone hydride level as a function of the Force Retention in Compression Relaxation of the resultant TPVs; a Si—H level of 1 would be that indicated in Table 5, while a 0.75 indicates that 75% of the Si—H level in the formulation was used.

DETAILED DESCRIPTION OF THE INVENTION

Described herein in one aspect is a method of melt blending. The method includes the melt blending of at least two polymers in one embodiment, wherein at least one polymer component is a curable polymer. The method further comprises the use of a melt blending means (or device), otherwise referred to herein as an "extruder." As used herein, the extruder comprises some geometry having a length with an "upstream" end and a "downstream" end, possessing addition points at various places along its length from zero percent (the farthest upstream addition point of the extruder), downstream the extruder to 100% down the extruder, and any place there between at a given percent downstream of the zero percent point. The extruder is such that it has a point of addition of at least one of the polymer components at from zero to 10% from the farthest upstream point of the extruder, or the "zero point" to the "10 point." Thus, the extruder is described as possessing addition points within the range of from a zero point to a 100 point the length of the extruder.

In one aspect of the invention at least one thermoplastic and at least one curable polymer is added within the range of from the zero to 10 point of the extruder. The at least one curable polymer is such that its cure is effectuated by the separate addition of at least one silicone hydride and at least one metal catalyst. At least one silicone hydride is added within the range of from the 5 to 30 point of the extruder. Further, at least one metal catalyst is added to the extruder within the range of from the 20 to 60 point of the extruder, with the proviso that the metal catalyst is added at least 5 or 10 or 15 points farther down (downstream from the zero point) the extruder than the point at which the silicone hydride is added to the extruder. Finally, a thermoplastic vulcanizate is isolated from the 90 to 100 point of the extruder, and at the 100 point of the extruder in a preferred embodiment.

As used herein, "cure" is interchangeable with the terms "cross-link" and "vulcanize," and describes the changing of a soluble, fusible polymer to an insoluble, infusible polymer. Such a polymer is a "curable" polymer, and can be one component of a curable polymer composition. In one embodiment, "cure" means that the long chains of the curable polymer, a rubber in one embodiment, become chemically bound to one another or cross-linked by reactions with the "cure agent" to form three-dimensional structures. The "cure agent" as described herein includes the silicone hydride and the metal catalyst, but can also include accelerators and other components as is known in the art.

In an aspect of the invention, the silicone hydride and metal catalyst are added separately, but as a pair, meaning that each is added to the polymer melt blend to effectuate the cure, but most preferably at separate locations or at different residence times of melt blending. In certain embodiments, the metal catalyst is added within the range of from the 25 to 45 point of the extruder, and from the 30 to 40 point in another embodiment, and within the range of from the 45 to 55 point in yet another embodiment; the silicone hydride is added at the 14 to 25 point of the extruder in one embodiment, and at the 16 to 20 point in another embodiment, and the 20 to 30 point in yet another embodiment, wherein any upper limit can be combined with any lower limit to achieve a desirable range of addition. The addition of the metal catalyst and silicone hydride is with the proviso that the metal catalyst is added at least 5 or 10 or 15 points farther down (downstream from the zero point) the extruder than the point at which the silicone hydride is added.

In certain embodiments, the extruder in which additions are made as described is such that the extruder possesses a length to diameter ratio (L/D) within the range of from 50:1 or 45:1 to 35:1 or 40:1, and an output within the range of from 60 or 65 kg/hr to 75 or 80 kg/hr. Also, in certain embodiments, the extruder used in which additions are made as described is a single or double barrel extruder, preferably a double barrel extruder. Preferably, in these embodiments, the extruder is a 40 to 60 mm diameter twin-screw extruder, and a 50 to 55 mm twin-screw extruder in a particular embodiment.

As used herein, "addition" means the placement of a component in the extruder such that it can be melt blended, and also means the combination of what is being added to the extruder with components already in and being melt blended within the extruder. The addition of components (e.g., rubber, thermoplastic, additives, cure agents) to the extruder can be effectuated simply by an opening along one or more points of the length of the extruder in one embodiment, and/or the use of one or more injection means such as syringe-type injectors or fluid-type injectors, or any other means known in the art for adding solids and/or fluids to the extruder.

The points of addition along the extruder length of the cure agent pairs can be adjusted to effectuate the end properties of the polymer blend formed from the melt blend process. In one embodiment a thermoplastic vulcanizate ("TPV") is the polymer blend that is isolated from the reactor, and it's properties, such as the amount of color of the TPV, its cure level, as measured for example by the Compression Set, and/or other properties can be tailored. In one aspect, the color of the TPV is adjusted independent of other TPV properties, thus allowing for the specific tailoring of the color of the TPV.

A TPV comprises one or more thermoplastics and one or more curable polymers, at least one curable polymer of which is at least partially cured. In aspects of the present invention, the thermoplastic and curable polymer are dynamically vulcanized. As used herein, the term "dynamic vulcanization" means vulcanization or curing of at least one curable polymer, curable rubber in a particular embodiment, blended with at least one thermoplastic under conditions of shear and/or temperatures sufficient to plasticize the mixture. A "fully vulcanized" (or fully cured or fully crosslinked) rubber can be characterized in one embodiment by a given percentage range of the crosslinkable rubber that is extractable in boiling xylene or cyclohexane, for example, 5 wt % or less, or 4 wt % or less, or 3 wt % or less, or 2 wt % or less, or 1 wt % or less. A polymer composition is partially cured when the extractables are greater than 5 wt %. The percentage of extractable rubber can be determined by the technique set forth in U.S. Pat. No. 4,311,628, and the portions of that patent referring to that technique, and as described below. The TPV may comprise other additives as described herein.

Thermoplastic vulcanizates typically have the characteristic of elasticity, that is, they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of Tensile Set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of Compression Set.

In one embodiment, the curable polymer is a rubber. The term "rubber" broadly means any material that is considered by persons skilled in the art to be a "rubber," preferably a crosslinkable rubber (e.g., prior to vulcanization) or crosslinked rubber (e.g., after vulcanization). In addition to natural rubber, specific rubber components include, without limitation, any olefin-containing rubber such as ethylene-propylene copolymers ("EPM"), including particularly saturated compounds that can be vulcanized using free radical generators such as organic peroxides, as noted in U.S. Pat. No. 5,177,147. Other rubber components are ethylene-propylene-diene ("EPDM") rubber, or EPDM-type rubber. An EPDM-type rubber can be a terpolymer derived from the polymerization of at least two different $C_2$-$C_{10}$ monoolefin monomers, preferably $C_2$-$C_4$ monoolefin monomers, and at least one $C_5$-$C_{20}$ poly-unsaturated olefin ("diene"). Those monoolefins desirably have the formula $CH_2$=CH—R where R is H or a $C_1$-$C_{12}$ alkyl. The preferred monoolefins are ethylene and propylene. Desirably, the repeat units from at least two monoolefins (and preferably from ethylene and propylene) are present in the polymer in weight ratios of 5:95 to 70:30 (ethylene:propylene) in one embodiment; and from 15:85 to 85:15 (ethylene:propylene) in another embodiment, and constitute from 90 to 99.6 wt % of the polymer. The polyunsaturated olefin can be a straight chained, branched, cyclic, bridged ring, bicyclic, fused ring bicyclic compound etc., and preferably is a nonconjugated diene. Desirably, repeat units from the nonconjugated polyunsaturated olefin are from 0.4 to 10 wt % of the rubber. Suitable dienes useful as comonomers are, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof. The diene, if present, is most preferably VNB; thus norbornadiene, 5-vinyl-2-norbornene (EP(VNB)DM) is the rubber used in the TPV in a particular embodiment.

Another type of rubber is butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinylbenzene. Desirably, from 90 to 99.5 wt % of the butyl rubber are repeat units derived from the polymerization of isobutylene, and from 0.5 to 10 wt % of the repeat units are from at least one polyunsaturated monomer having from 4 to 19 carbon atoms. Preferably, the polyunsaturated monomer in the butyl rubber is isoprene or divinylbenzene. The polymer may be halogenated to further enhance reactivity in crosslinking. Preferably, the halogen is present in amounts from 0.1 to 10 wt %, more preferably 0.5 to 3.0 wt % based upon the weight of the halogenated polymer; preferably the halogen is chlorine or bromine. The brominated copolymer of p-alkylstyrene, having from 9 to 12 carbon atoms, and an isomonoolefin, having from 4 to 7 carbon atoms, desirably has from 88 to 99 wt % isomonoolefin, more desirably from 92 to 98 wt %, and from 1 to 12 wt % p-alkylstyrene, more desirably from 2 to 8 wt % based upon the weight of the copolymer before halogenation. Desirably, the alkylstyrene is p-methylstyrene and the isomonoolefin is isobutylene. Desirably, the percent bromine is from 0.2 to 8, more desirably from 0.2 to 3 wt % based on the weight of the halogenated copolymer. The copolymer is present in a complementary amount, that is, from 92 to 99.8, more desirably from 97 to 99.8 wt %. These polymers are commercially available from ExxonMobil Chemical Co. and other sources.

EPDM, butyl and halobutyl rubbers are rubbers low in residual unsaturation and are preferred when the vulcanizate needs good thermal stability or oxidative stability. The rubbers low in residual unsaturation desirably have less than or equal to 10 wt % repeat units having unsaturation.

Rubbers can also include natural rubbers or synthetic homo- or copolymers of at least one conjugated diene. Those rubbers are higher in unsaturation than EPDM rubber or butyl rubber. Those rubbers can optionally be partially hydrogenated to increase thermal and oxidative stability. Desirably, those rubbers have at least 50 wt % repeat units from at least one conjugated diene monomer having from 4 to 8 carbon atoms. Comonomers that may be used include vinyl aromatic monomer(s) having from 8 to 12 carbon atoms and acrylonitrile or alkyl-substituted acrylonitrile monomer(s) having from 3 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

Rubbers can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

A list of preferred rubber components includes any rubber selected from the following: ethylene-propylene rubber (EPM), ethylene-propylene-diene rubber (EPDM), EP(VNB)DM, natural rubber (polyisoprene), butyl rubber, halobutyl rubber, halogenated rubber copolymer of p-alkystyrene and at least one $C_4$-$C_7$ isomonoolefin, a copolymer of isobutylene and divinylbenzene, homopolymers of a conjugated diene (preferably a $C_4$-$C_8$ conjugated diene), copolymers of at least one conjugated diene and a comonomer (preferably where the copolymer has at least 50 wt % repeat units from at least one $C_4$-$C_8$ conjugated diene and/or the comonomer is a polar monomer, a $C_8$-$C_{12}$ vinyl aromatic monomer, an acrylonitrile monomer, a $C_3$-$C_8$ alkyl substituted acrylonitrile monomer, an unsaturated carboxylic acid monomer, an unsaturated anhydride of a dicarboxylic acid or a combination thereof), unsaturated non-polar elastomers, polybutadiene elastomer, styrene-butadiene elastomer and mixtures thereof.

The term "thermoplastic" broadly means any polymer that is not a "rubber" (as defined herein) and that is a polymer or polymer blend considered by persons skilled in the art as being thermoplastic in nature, that is, a polymer that softens when exposed to heat and returns to its original condition when cooled to room temperature. The thermoplastics of the present invention may be selected from any of the following: crystallizable polyolefins, polyimides, polyamides, polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, polyurethanes and mixtures thereof.

In one or more embodiments, the thermoplastic is a polypropylene (isotactic in a particular embodiment) having a melting point greater than 90, or 100, or 110, or 120, or 130, or 140, or 150° C., and less than 180, or 170° C. In certain embodiments, the thermoplastic may include a polypropylene polymer having a melt flow rate ("MFR", 230° C./2.16 kg) of 1.0 to 30 dg/min. Alternatively, the thermoplastic component may include a "fractional" polypropylene having a melt flow rate less than 1.0 dg/min. In yet another embodiment, the thermoplastic further includes a first polypropylene having a melting point greater than 110° C. and a melt flow rate ranging from 1.0 to 30 dg/min and a second polypropylene having a melting point greater than 110° C. and a melt flow rate of less than 1.0 g/min.

Preferably, the polypropylene of the TPV described herein that has a melting point above 110° C. and includes at least 90 wt % propylene units and is a polypropylene homopolymer, or copolymer comprising from 0.1 to 5 wt % $C_2$ or $C_4$ to $C_{10}$ α-olefin derived units. Alternatively, instead of isotactic polypropylene, a first component of the present invention may include a syndiotactic polypropylene, which in certain cases can have a melting point above 110° C. Yet another alternative thermoplastic can include an atactic polypropylene. The polypropylene can either be derived exclusively from propylene monomers (i.e., having only propylene units) or be derived from mainly propylene (more than 80% propylene). Certain polypropylenes having a high MFR (230° C., 2.16 kg) for example, from a low of 10, or 15, or 20 dg/min to a high of 25 or 30 dg/min, may be used as the thermoplastic. Others having a lower MFR, e.g., "fractional" polypropylenes which have an MFR less than 1.0 dg/min may also be used.

The thermoplastic may be present in the TPV in an amount within the range of from 5 or 10 or 15 or 20 or 30 to 40 or 50 or 60 or 70 wt %, by weight of the TPV. The curable polymer may be present in the TPV in an amount within the range of from 5 or 10 or 15 or 20 or 30 to 40 or 50 or 60 or 70 wt %, by weight of the TPV.

The "additive" can include any material that may be included as a part of the TPV, beyond the minimum of having at least one thermoplastic and at least one curable polymer. For example, any process oil, curing agent, or filler is regarded as an "additive" for purposes of this disclosure. Also, other polymers such as LDPE, HDPE, LLDPE, propylene copolymers, plastomers (ethylene-based copolymers), styrenic copolymers, fluoropolymers, and other polymers can be added to the extruder as an additive. A non-exclusive list of additives broadly includes carbon black and other particulate fillers, silica, titanium dioxide, colored pigments, clay, zinc oxide, stearic acid, stabilizers, anti-degradants, flame retardants, processing aids, adhesives, tackifiers, plasticizers, wax, and discontinuous fibers (such as cellulose fibers). Particularly when non-black fillers are used, it is desirable to include a coupling agent to compatibilize the interface between the non-black fillers and the polymers. The filler, when present, is present within the range of from 5 or 10 to 30 or 40 or 50 wt %, by weight of the TPV, in one embodiment. The process oil, when present, is present within the range of from 5 or 10 to 30 or 40 or 50 wt %, by weight of the TPV, in one embodiment.

In one embodiment of the invention, the silicone hydride cure agent (or "silicone hydride") is selected from $Si_5$ to $Si_{100}$ silicone hydrides, meaning that the silicone hydride comprises from 5 to 100 Si atoms and at least two or more Si—H groups. In a preferred embodiment, the silicone hydride also comprises at least two Si—O— groups. In another embodiment, the silicone hydride is selected from $Si_5$ to $Si_{30}$ silicone hydrides having from 4 to 40 $C_1$ to $C_{10}$ alkyl groups, $C_1$ to $C_5$ alkyls in a particular embodiment, such as Si—R and/or Si—O—R, wherein R is the alkyl group; the remaining groups are Si—H groups. In yet another embodiment, the silicone hydride is described generally as possesses "Si—H" groups and "Si—R" groups, wherein the number of Si—H groups is greater than the number of Si—R groups, where R is selected from $C_2$ to $C_{10}$ alkyls. In yet another embodiment, the silicone hydride possesses Si—H groups and Si—R groups, wherein the number of Si—H groups is at least twice the number of Si—R groups, where R is selected from $C_2$ to $C_{10}$ alkyls.

More particularly, the curative composition (comprising one or more cure agents) useful in the present invention comprises in one embodiment a silicone hydride having the formula (2):

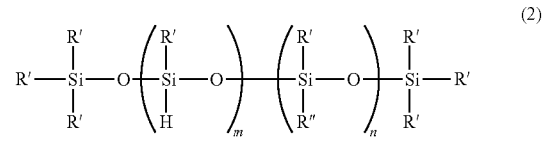

wherein H is hydrogen, and each R' is independently selected from hydrogen and $C_1$ to $C_{10}$ alkyl groups, and is selected from $C_1$ to $C_7$ alkyl groups in a more particular embodiment, and selected from $C_1$ to $C_5$ alkyl groups in yet a more particular embodiment; R" is selected from $C_1$ to $C_{10}$ alkyl groups, and a $C_1$ to $C_7$ alkyl groups in a more particular embodiment, and a $C_1$ to $C_3$ alkyl groups in yet a more particular embodiment; n is an integer from 5 to 45, and from 5 to 30 in another embodiment; and m is an integer from 5 to 45, and from 5 to 30 in another embodiment. In certain embodiments, m+n is less than 50 or 40 or 30. It is understood that each [R'SiHO] and [R'SiR"O] moiety may occur randomly and not necessarily sequentially.

In yet another embodiment of the silicone hydride (2), m is an integer from 5 to 25; and n is 0. And in yet a more particular embodiment, each R' is independently selected from $C_1$ to $C_3$ alkyl groups; R" is a $C_1$ to $C_3$ alkyl group; m is an integer from 12 to 30; and n is an integer from 2 to 18; with the proviso that m>n. In yet another embodiment of the silicone hydride of (2), when n=0, m>1, where R' and R" can be as described throughout. In a particular embodiment of (2), each R' is methyl and R" is a $C_1$ to $C_7$ alkyl and m and n are as described throughout. Useful silicone hydrides can be obtained from Hans Chemie and Dow Corning. The silicone hydride may be used in the form of a solid, slurry, solution or liquid.

The at least one other cure agent that is part of the curative composition, and comprises the "pair" that is injected into the extruder, is a metal catalyst compound ("metal catalyst"). The metal catalyst is selected from Group 9 to 12 metal compounds in one embodiment, and selected from Group 10 metal compounds in another embodiment. In a preferred embodiment, the metal catalyst is platinum, and zero valent finely ground platinum metal in a particular embodiment. The metal catalyst may be used in the form of a solid powder or fine granules, a slurry/suspension in a non-reactive diluent, or a solution in a non-reactive diluent. In one embodiment, the metal catalyst is added to within the range of from 1 or 5 ppm to 10 or 20 or 30 or 50 or 70 ppm based on the rubber content.

The melt blending device, or "extruder," useful in the present invention can take on any form, but is preferably of a cylindrical shape having various addition (e.g., injection) points along its length. Preferred examples of melt blending devices include traditional single, double, or multiple screw extruders as is known in the art. In another embodiment, the device is one such as a Banbury mixer, wherein the ingredients of the TPV can be added sequentially in the same or similar location at different times that depend upon the residence time of the materials being melt blended. The extruder in one embodiment is a device that can melt blend the components in the extruder at from 170° C. to the decomposition temperature of the component that decomposes at the lowest temperature, and from 180 to 290° C. in another embodiment, and from 190 to 280° C. in another embodiment, and from 190 to 250° C. in yet another embodiment. Further, the residence time of the extruder can be adjusted to any desirable level.

Described another way, the extruder is a device that can melt blend the components at a shear rate of from 1000 to 10,000 $s^{-1}$ in one embodiment, and from 2000 to 8000 $s^{-1}$ in another embodiment, and a shear rate of from 2500 to 7500 $s^{-1}$ in yet another embodiment, and from 4000 to 7000 $s^{-1}$ in yet another embodiment, and from 5000 to 8000 $s^{-1}$ in yet a more particular embodiment.

In one embodiment, the extruder is a single screw-type extruder having one or more barrels combined in sequence, forming a cavity with at least one screw running there through, and where any one or more of the barrels may have an addition point for polymers, additives, and cure agents. In another embodiment, the screw-type extruder is made from one or more segments that have addition points along its length. The individual barrels may be separately heated; or the distinct regions and/or segments of the screw-type extruder can be heated in another embodiment. In one embodiment, the screw-type extruder has length to diameter ratio within the range of from 80 to 5, and from 60 to 10 in another embodiment, and from 50 to 15 in yet another embodiment, and is within the range of from 50 to 35 in yet another embodiment. In yet another embodiment, the output rate of the extruder is within the range of from 10 to 100 kg/hr, and from 60 to 80 kg/hr in another embodiment. Preferably, in these embodiments, the extruder is a 40 to 60 mm diameter twin-screw extruder, and a 50 to 55 mm twin-screw extruder in a particular embodiment.

The resultant TPVs as described herein may have an Ultimate Tensile Strength (measured as described below) within the range of from greater than 300 psi (2.00 MPa) in one embodiment, and greater than 870 psi (6.00 MPa) in another embodiment, and greater than 920 psi (6.29 MPa) in yet another embodiment. In other embodiments, the resultant TPVs may have a 100% Modulus (measured as described below) within the range of from greater than 40 psi (0.276 MPa), and greater than 380 psi (2.62 MPa) in another embodiment, and greater than 390 psi (2.69 MPa) in another embodiment. In yet another embodiment, the resultant TPVs may have an Ultimate Elongation (measured as described below) of greater than 200%, and greater than 400% in another embodiment, and greater than 420% in another embodiment, and within the range of from 380 to 520%, and within the range of from 400 to 500% in yet another embodiment. In yet another embodiment, the TPV's have a Compression Set (22 hr@100° C.; measured as described below) of less than 45%, and less than 42% in another embodiment, and within the range of from 20 to 45% in yet another embodiment.

Examples of the Invention

Addition Point Experiments with [Silicone Hydride:Metal Catalyst] Pairs

Thermoplastic vulcanizates (TPVs) with a target hardness of 60 Shore A (See Table 1 for formulation) were produced by the dynamic vulcanization of EP(VNB)DM in isotactic polypropylene, with a "Control silicone hydride" (formula (2), where R' is methyl and R" is an octyl group m=13 and n=5) or an "Inventive silicone hydride A" (formula (2), where R' and R" are methyl groups, m=17 and n=7) as the silicone hydride rubber curative, and with Pt° (platinum metal, zero valent, about 2 ppm based on the rubber) in paraffinic oil as cure catalyst. The EP(VNB)DM terpolymer is Vistalon™ 1696 from ExxonMobil Chemical Co. The polypropylene homopolymer is F008F (0.8 dg/min, 230° C., 2.16 kg) from Sunoco. The oil in each addition is Paralux™ 6001R, which is a paraffinic oil made by ChevronTexaco.

Figure 1:
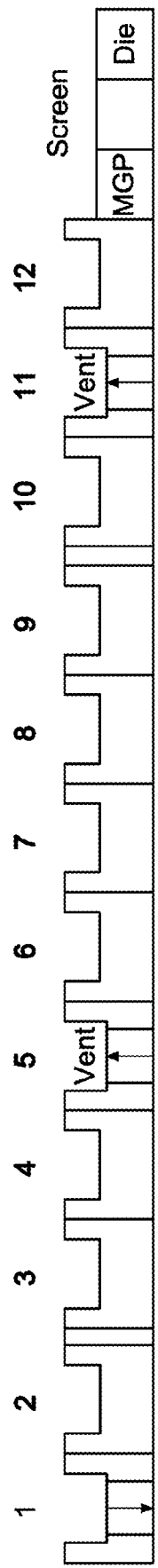
FIG. 1 is a drawing of the type of extruder, having individual barrels and addition points, as used in the Examples.

The TPVs were prepared in a 53 mm Werner & Pfleiderer ZSK 53 twin screw extruder that was fitted with co-rotating and intermeshing screws (FIG. 1). The output of the twelve-barrel (L/D=42) extruder was fed into a melt gear pump which transferred the molten polymer blend through a die via a screen pack (20/100/20 triple mesh) that filtered out particulate material in the molten product. An underwater pelletizer was used to process the output of the die.

Some of the extruder barrels (sections in extruder in FIG. 1) had liquid injection ports labeled "up" (U), "middle" (M), or "downstream" (D). These labels marked the liquid injection position on the barrel with respect to the extruder feed throat. Paraffinic oil was fed into the extruder at 2D (barrel 2, downstream), and at 8D.

Granulated rubber that was blended with clay and zinc oxide, was metered into the extruder feed throat, as was a separate feed stream of polypropylene pellets. The screw elements in the first section of the extruder (barrels 1-4) were designed to form an intimate melt blend of the polymeric materials, filler, and oil. At the feed hopper, conveying screw elements transported the feed material into kneading elements that also had a conveying action for good distributive mixing. These kneading elements were interspersed with conveying elements in order to reduce pressure build up that could cause material to back up in the feed throat, and also for temperature control. At the beginning of the process, the soft rubber granules get compressed with the filler prior to the onset of distributive mixing. A gear element was used to assist in the rapid blending of the added process oil with the material in the barrel. In this section in the extruder, the screw consisted of "neutral" kneading elements (no conveying action) that were interspersed with conveying elements and kneading elements with some conveying action. Thus, good dispersive mixing, while allowing temperature and pressure control. A reverse conveying element assisted in the formation of a polymer melt seal that was needed to prevent material plugging the vent port on barrel 5. An intimate melt blend of materials was formed at the end of barrel 4. Downstream of barrel 4 ("4D"), the screw design consisted of appropriately spaced kneading elements with limited conveying action, "neutral" kneading elements, and conveying elements. A gear element was also used for efficient mixing of the oil added at 8D with the polymer melt; and a reverse conveying element, present at the end of barrel 10, provided a melt seal to prevent plugging of the vent port at barrel 11. After barrel 11, only various conveying elements, designed to provide a continuous polymer melt stream to the melt gear pump, were present.

The liquid silicone hydride rubber curative and the platinum catalyst solution in oil was injected as per the schedule in Tables 2a-2c. The dynamic vulcanization process commenced with platinum catalyst addition. Thermoplastic vulcanizes were produced at 70 kg/hr and at a screw speed of 350 rpm. The barrel set temperatures were (barrel#/° C.): 2/200, 3/200, 4/180, 5/180, 6/190, 7/190, 8/180, 9/180, 10/170, 11/165, 12/170, melt gear pump 200° C., and die 180° C.

The vacuum sealed vent ports allowed the removal of polymer degradation products, moisture, and also the low molecular weight components of the oil. Process details are provided in U.S. Pat. No. 4,594,390. The function of screw elements is described in a publication from Coperion Corporation ("Processing Times", 9 (1), Jan. 1999).

Figure 3A:
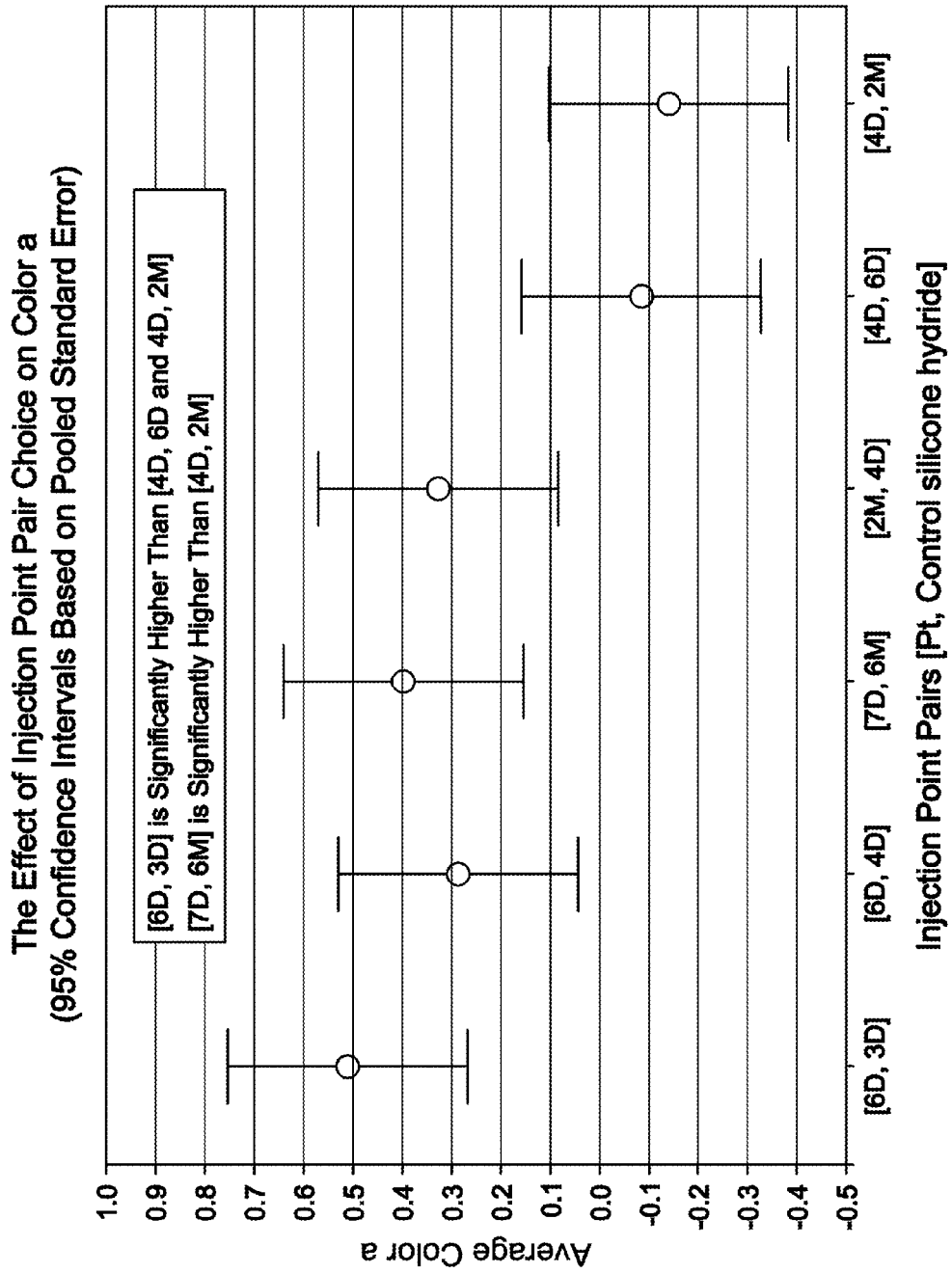
Figure 3B:
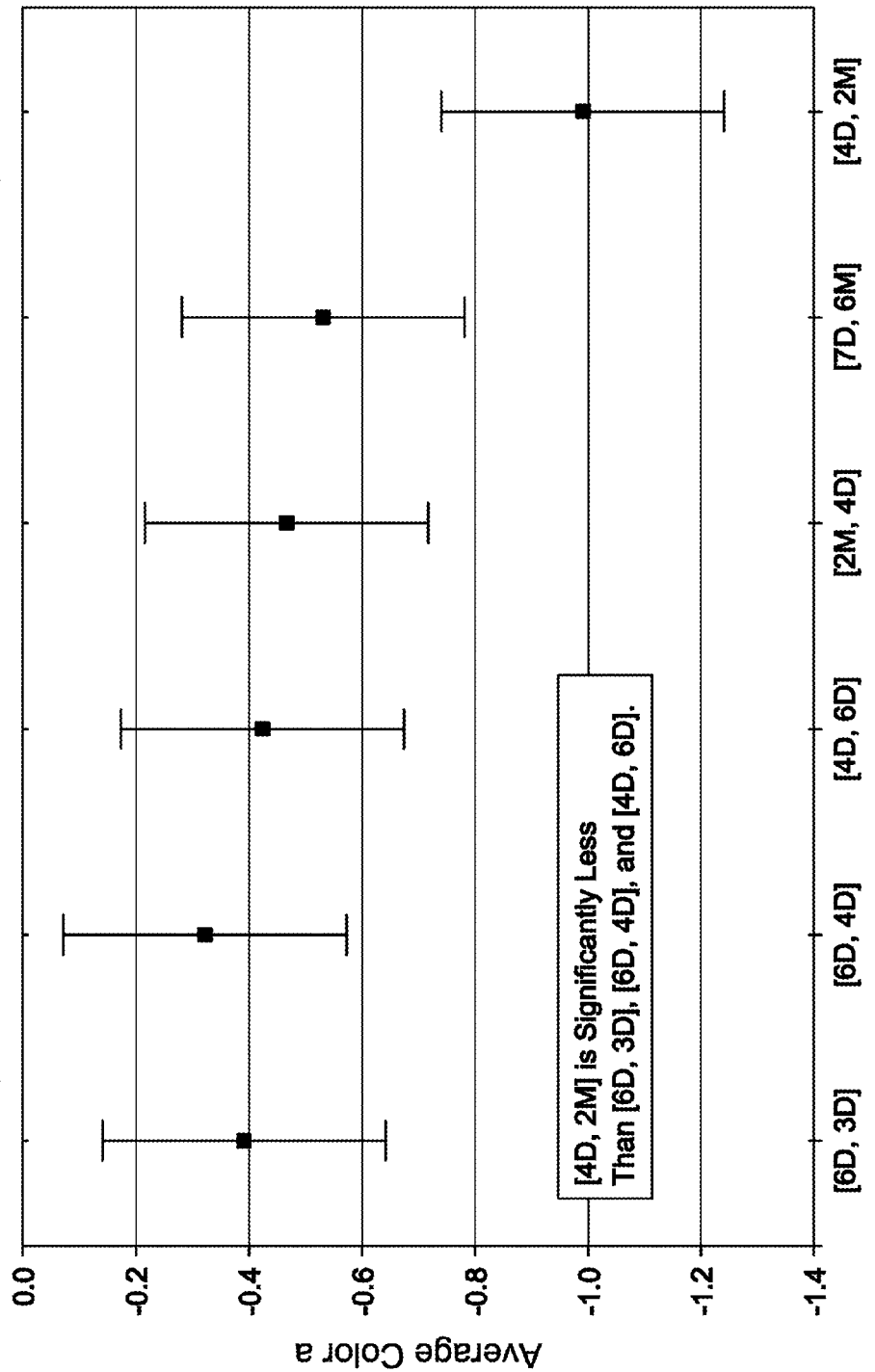
Figure 4B:
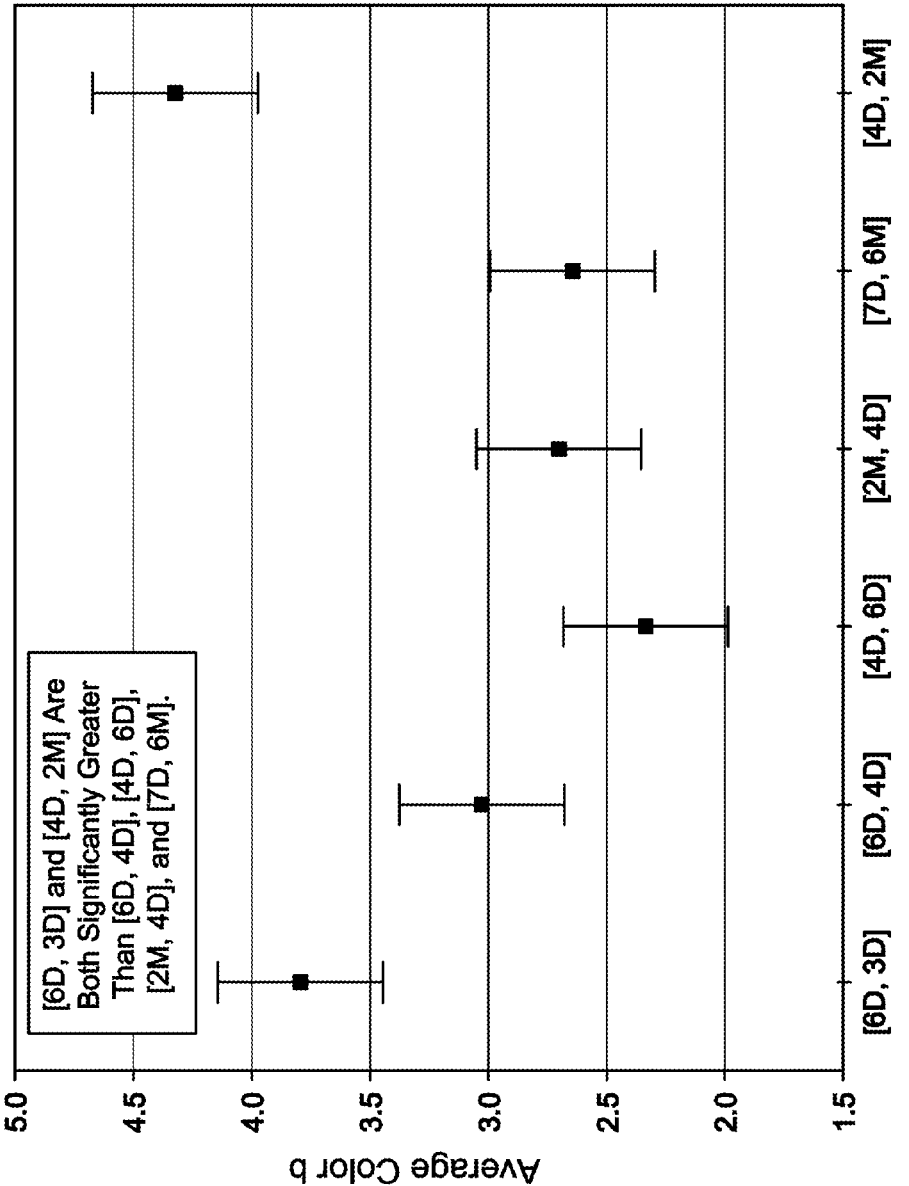

For each pair of rubber curative and catalyst injection point of Tables 2a-2c, three sample TPVs were produced. The entire experimentation sequence was randomized using a computer generated schedule. The Control silicone hydride and Inventive silicone hydride A were evaluated separately. Color value (L, a, b) for the TPVs (plotted along the ordinate) versus curative and catalyst injection location (plotted along the abscissa) is presented in FIGS. 2-4 (corresponding to data in Tables 2a-2c). The sample standard deviation of each group (i.e., the three sample TPVs prepared for each injection point pair) was found to be statistically homogeneous, and the error bars represent the 95% confidence interval about the arithmetic mean. The statistically significant differences in the color values as a function of catalyst injection location for the Control silicone hydride curative, and separately for the Inventive silicone hydride A, was determined via analysis of variance (ANOVA) and follow-up comparisons using the Tukey-Kramer method. In FIG. 4, an outlying data point corresponding to experiment #13 (Table 6) was omitted from the model. From the data presented, it is clear that the curative and catalyst injection location used for TPV preparation can be used as a tool for TPV color control. The other TPV physical properties listed in Tables 3 and 4 exhibited no statistically significant differences as a function of curative and catalyst injection point location. Hence, TPV color can be controlled without affecting other TPV physical properties.

Color "L", "a" and "b" test method is as follows: LabScan™ XE reflectance spectrometer from HunterLab was used to measure color. Statistically designed experiments varying ingredients, and statistical analysis of variance (ANOVA) for effects on compound cure, physical and color properties were made. An explanation of the color measurements, based on the Hunter color scheme (L=0, black; L=100, white; +a, red; −a, green; +b, yellow; −b, blue), can be found in 8(9) *Applications Note*, 1-15 (Hunter Associates Laboratory, Inc., August 1996).

Other test methods are as follows:
Shore A hardness was determined according to ISO 868 and ASTM D-2240.
Ultimate tensile strength ("UTS"), ultimate elongation ("UE"), and 100% modulus ("M100") were determined according to ASTM D-412 at 23° C. by using an Instron testing machine.
Compression Set ("CS") (%, 22 hrs, 70° C. or 100° C.), and the test procedure used to measure that property was ASTM D-395.
Weight gain was determined according to ASTM D-471.
Tension Set ("TS"), measured by taking a 2-inch long specimen with 0.08 inch thickness and width at room temperature, elongating it 100% for ten minutes, then allowing it to relax for ten minutes. The percentage change in length is the Tension Set.
Tear C was measured by ASTM D 1004-90.
Taber Abrasion was measured by ASTM D 1044-94.
LCR capillary viscosity was determined with a Dynisco™ Capillary Rheometer at 30:1 L/D at 1200 s$^{-1}$.
Extrusion Surface Roughness ("ESR") in microinches was measured as described in *Chemical Surface Treatments of Natural Rubber and EPDM Thermoplastic Elastomers: Effects on Friction and Adhesion*, 67(4) RUBBER CHEMISTRY AND TECHNOLOGY 582 (1994). The rating for each sample was determined by using a Federal stylus profilometer.

TABLE 1

Basic Formulation

| Components | Wt % | phr |
|---|---|---|
| EP(VNB)DM | 55 | 200 |
| Icecap ™ K Clay | 11.5 | 42.0 |
| ZnO (Kadox ™ 911) | 0.5 | 2.00 |
| hPP | 13.7 | 50.0 |
| Oil, first addition (2D) | 1.7 | 6.0 |
| Silicone Hydride | 0.5 | 2.0 |
| Platinum 085 (0.22 wt % in oil) | 0.7 | 2.50 |
| Oil, second addition (8D) | 16.4 | 60.0 |

TABLE 2a

Platinum/silicone hydride addition pairs into the extruder: color L

| Addition Pair [Pt, SiH] (% point Pt, % point SiH) | Color L (±2) Sample 1 | Color L (±1) Sample 2 |
|---|---|---|
| 6D, 3D (50, 25) | 78.2 | 81.8 |
| 6D, 4D | 74.6 | 77.2 |

TABLE 2a-continued

Platinum/silicone hydride addition pairs into the extruder: color L

| Addition Pair [Pt, SiH] (% point Pt, % point SiH) | Color L (±2) Sample 1 | Color L (±1) Sample 2 |
|---|---|---|
| 6D, 3D (50, 33) | | |
| 7D, 6M (58, 33) | 75.2 | 79.5 |
| 2M, 4D (16, 33) | 77.0 | 79.0 |
| 4D, 6D (33, 50) | 72.5 | 77.5 |
| 4D, 2M (33, 16) | 81.5 | 84 |

TABLE 2b

Platinum/silicone hydride addition pairs into the extruder: color a

| Addition Pair [Pt, SiH] (% point Pt, % point SiH) | Color a (±0.3) Sample 1 | Color a (±0.3) Sample 2 |
|---|---|---|
| 6D, 3D (50, 25) | 0.5 | −0.4 |
| 6D, 4D (50, 33) | 0.3 | −0.35 |
| 7D, 6M (58, 33) | 0.4 | −0.42 |
| 2M, 4D (16, 33) | 0.35 | −0.5 |
| 4D, 6D (33, 50) | −0.1 | −0.55 |
| 4D, 2M (33, 16) | −0.2 | −1.2 |

TABLE 2c

Platinum/silicone hydride addition pairs into the extruder: Color b

| Addition Pair [Pt, SiH] (% point Pt, % point SiH) | Color b (±0.4) Sample 1 | Color b (±0.4) Sample 2 |
|---|---|---|
| 6D, 3D (50, 25) | 4.70 | 3.47 |
| 6D, 4D (50, 33) | 3.50 | 3.00 |
| 7D, 6M (58, 33) | 3.40 | 2.25 |
| 2M, 4D (16, 33) | 3.25 | 2.60 |
| 4D, 6D (33, 50) | 3.25 | 2.50 |
| 4D, 2M (33, 16) | 5.20 | 4.25 |

TABLE 3

Physical Properties of TPVs using Control silicone hydride

| Property | Min | Avg | Max |
|---|---|---|---|
| Hardness (Shore A) | 61 | 62 | 62 |
| UTS (psi) | 690 | 704 | 722 |
| UE (%) | 432 | 456 | 480 |
| M 100 (psi) | 284 | 291 | 297 |
| Wt Gain (%) | 99 | 100 | 101 |
| LCR (1200 $s^{-1}$, Pa · s) | 58 | 59 | 62 |
| ESR (Ra) | 69 | 91 | 146 |
| CS (%, 70° C., 22 hr) | 29 | 29 | 30 |
| CS (%, 100° C., 22 hr) | 35 | 37 | 42 |
| CS (%, 125° C., 22 hr) | 54 | 57 | 56 |

TABLE 4

Physical Properties of TPVs using Inventive Silicone Hydride A

| Property | Min | Avg | Max |
|---|---|---|---|
| Hardness (Shore A) | 64 | 64 | 65 |
| UTS (psi) | 683 | 730 | 763 |
| UE (%) | 414 | 440 | 469 |
| M 100 (psi) | 295 | 305 | 313 |
| Wt Gain (%) | 87 | 90 | 95 |
| LCR (1200 $s^{-1}$, Pa · s) | 55 | 57 | 60 |
| ESR (Ra) | 44 | 47 | 50 |
| CS (%, 70° C., 22 hr) | 29 | 30 | 31 |
| CS (%, 100° C., 22 hr) | 34 | 36 | 37 |
| CS (%, 125° C., 22 hr) | 45 | 47 | 49 |

Non-Alkylated and Low-Alkylation Silicone Hydride Curative Experiments

Experiments were also conducted in order to compare the impact of silicone hydride Inventive silicone hydride A and Control silicone hydride on TPV processability and physical properties. The formulations are in Table 5, and the ingredients are the same as above, except hPP(1) is the Sunoco product, and hPP(2) is ExxonMobil PP 2252E2 (4 dg/min, 230° C., 2.16 kg, ExxonMobil Chemical Co.). Thermoplastic vulcanize formulations that were suitable for the preparation of 90, 60, and 40 Shore A hardness products (see Table 5) were produced, using both a standard level of silicone hydride curative, and also with 75% of the standard curative level, on the ZSK 53 mm twin screw extruder.

For all experiments, the silicone hydride curative was injected at 3D, and the platinum catalyst solution at 6D. The barrel set temperatures (barrel #/° C.) were: 2/180, 3/170, 4/170, 5/165, 6/165, 7/165, 8/165, 9/170, 10/180, 11/180, 12/180, melt gear pump/200° C., and die/180° C.

In one block of randomized (computer generated schedule by algorithm) experiments, the three TPVs were produced at both the high and low level of the Control silicone hydride as the rubber curative. The experiments were then repeated using the Inventive silicone hydride A as curative. Both blocks of experiments were then rerun (Table 6).

A general linear model was used to analyze the outcome of the experiments, with terms in the model consisting of the experimental blocks, silicone hydride type, silicone hydride level, TPV formulation, and also interaction terms between experimental blocks and silicone hydride type, silicone hydride type and silicone hydride level, silicone hydride level and TPV formulation, silicone hydride type and TPV formulation, and interaction terms between silicone hydride type, silicone hydride level, and TPV formulation.

The effect of silicone hydride type and level on color L, when TPVs of similar hardness are compared, is listed in Table 7. The probability of a "yes" listing being incorrect in Table 7 is less than 5% (p<0.05). Generally, whiter TPVs result with the use of Inventive silicone hydride A as curative over Control silicone hydride. Other TPV physical properties did not exhibit any statistically-significant differences, irrespective of curative type or level, within each formulation. The value of the physical properties, averaged over all the results obtained for each formulation, is listed in Table 8.

The effect of TPV hardness, silicone hydride level, and silicone hydride choice, on force retention in a compression stress relaxation test at 100° C., is graphed in FIG. 5. For the 40 Shore A and 60 Shore A target formulations, it appears that TPVs produced with Inventive silicone hydride A as curative offers increased force retention (improved elastic recovery) over those produced with Control silicone hydride. However, the model indicates that these differences within each TPV grade are not statistically significant. Since the silicone hydride type was kept constant within a block of experiments (Table 6), the power of the model to detect differences between the silicone hydride types is limited. Further randomization of the experimental design is necessary in order to conduct a thorough assessment of the value of Inventive silicone hydride A in the production of TPVs with increased elastic recovery over those produced with Control silicone hydride.

A one-point comparison of the physical properties of a 60 Shore A hardness target TPV formulation (Table 1), produced on the ZSK 53 mm twin screw extruder, with Control silicone hydride or Inventive silicone hydride B (m=17, n=0, R' is methyl of formula 2), or the Inventive silicone hydride A as curative, is listed in Table 9. Improved compression set is observed when Inventive silicone hydride B or the Inventive silicone hydride A is used as curative, over the product produced with Control silicone hydride. Furthermore, the TPV produced with the Inventive silicone hydride A exhibits improved abrasion resistance, presumably due to a low coefficient of friction of the product that is allowed by the use of this curative.

In summary, curative package injection location can be used as a tool to control TPV color in hydrosilylation-cured TPVs. Also, the use of silicone hydride curatives of the Inventive silicone hydride A type allows the production of TPVs with increased whiteness and abrasion resistance, and lowered cost, over those prepared with the Control silicone hydride type curatives, while TPV physical properties, processability (melt viscosity (LCR)), and fabricated part surface appearance (ESR) are unchanged.

TABLE 5

TPV Formulations for Target Hardness TPVs

| Formulation Target Hardness Shore A (wt %) | 40 | 60 | 90 |
|---|---|---|---|
| EP(VNB)DM | 48 | 55 | 39 |
| Icecap ™ K Clay | 7.2 | 11.5 | 8.2 |
| ZnO (Kadox ™ 911) | 0.5 | 0.5 | 0.4 |
| hPP (1) | — | 13.7 | 39 |
| hPP (2) | 10.1 | — | — |
| Oil, first addition at (2D) | 9.6 | 1.6 | 1.9 |
| silicone hydride, addition at (3D) | 0.4 | 0.5 | 0.5 |
| Platinum in oil, addition at (6D) | 0.6 | 0.7 | 0.6 |
| Oil, second addition at (8D) | 23.6 | 16.5 | 10.7 |

TABLE 6 a. Experimental Setup

| Design Run # | 1 | 2 | 3 | 4 | 5 | 6 |
|---|---|---|---|---|---|---|
| TPV Formulation (Shore A Hardness Target) | 60 | 90 | 40 | 40 | 60 | 90 |
| Silicone Hydride Level (Control) | 1 | 1 | 0.75 | 1 | 0.75 | 0.75 | b. Experimental Setup

| Design Run # | 7 | 8 | 9 | 10 | 11 | 12 |
|---|---|---|---|---|---|---|
| TPV Formulation (Shore A Hardness Target) | 40 | 90 | 40 | 60 | 90 | 60 |
| silicone hydride level (inventive A) | 0.75 | 1 | 1 | 1 | 0.75 | 0.75 |

TABLE 7

Color relationship to Curative

| TPV Hardness (Shore A) | Silicon Hydride | Level (phr) | Predicted Color L | Significant at $p < 0.05$ |
|---|---|---|---|---|
| 60 | Control | 0.75 | 83.2 | No |
| 60 | Inv. A | 0.75 | 84.4 | |
| 90 | Control | 0.75 | 83.2 | Yes |
| 90 | Inv. A | 0.75 | 85.1 | |
| 40 | Control | 0.75 | 82.9 | No |
| 40 | Inv. A | 0.75 | 82.7 | |
| 60 | Control | 1 | 84.0 | Yes |
| 60 | Inv. A | 1 | 85.9 | |
| 90 | Control | 1 | 83.6 | No |
| 90 | Inv. A | 1 | 84.7 | |
| 40 | Control | 1 | 83.9 | Yes |
| 40 | Inv. A | 1 | 86.1 | |

TABLE 8

Physical Properties of TPVs

| Formulation Target Hardness (Shore A) | 40 | 60 | 90 |
|---|---|---|---|
| Hardness (Shore A) | 45 | 64 | 94 |
| UTS (psi) | 361 | 677 | 1703 |
| UE (%) | 316 | 449 | 652 |
| CS (%, 100° C., 22 hr) | 30 | 40 | 63 |
| LCR (Pa · s, 1200 $s^{-1}$, 204° C.) | 40 | 60 | 73 |
| ESR (Ra) | 87 | 66 | 79 |

TABLE 9

Physical Properties of the TPVs

| Property | Control | Inventive B | Inventive A |
|---|---|---|---|
| Hardness (Shore A) | 60 | 62 | 62 |
| UTS (psi) | 864 | 934 | 927 |
| UE (%) | 471 | 449 | 395 |
| M100 (psi) | 381 | 397 | 432 |
| CS (%, 22 hr @ 100° C.) | 47 | 41 | 40 |
| Wt. Gain (%, IRM 903, 21 hr @ 121° C.) | 101 | 90 | 81 |
| TS (%) | 11 | 9 | 9 |
| Tear C (psi) | 116 | 107 | 108 |
| Taber Abrasion (mg loss/1000 cycles) | 31 | 33 | 17 |
| LCR (Pa · s @ 1200 $s^{-1}$, 204° C.) | 68 | 64 | 65 |
| ESR | 53 | 42 | 45 |
| Color L | 79 | 81 | 82 |

Having described the invention in its various aspects, in numbered embodiments herein is:

1. A method of melt blending comprising: (a) providing an extruder possessing addition points from a zero point to a 100 point the length of the extruder; (b) adding at least one thermoplastic and at least one curable polymer at the zero to 10 point of the extruder; (c) adding at least one silicone hydride at the 5 to 30 point of the extruder; (d) adding at least one metal catalyst at the 20 to 60 point of the extruder, with the proviso that the metal catalyst is added at least 5 points farther down the extruder than the silicone hydride; and (e) isolating a thermoplastic vulcanizate from the 90 to 100 point of the extruder.

2. The method of numbered embodiment 1, wherein the metal catalyst is added at the 25 to 45 point of the extruder, and the silicone hydride is added at the 14 to 25 point of the extruder.

3. The method of numbered embodiments 1 and 2, wherein the metal catalyst is added at the 45 to 55 point of the extruder, and the silicone hydride is added at the 20 to 30 point of the extruder.
4. The method of any of the previous numbered embodiments, wherein the metal catalyst is added at least 10 points farther down the extruder than the silicone hydride.
5. The method of any of the previous numbered embodiments, wherein the metal catalyst is selected from Group 9 to 12 metal compounds.
6. The method of any of the previous numbered embodiments, wherein the silicone hydride is selected from $Si_5$ to $Si_{50}$ silicone hydrides.
7. The method of any of the previous numbered embodiments, wherein the silicone hydride is selected from $Si_5$ to $Si_{30}$ silicone hydrides having from 4 to 40 $C_1$ to $C_{20}$ alkyl groups.
8. The method of numbered embodiment 7, wherein the silicone hydride possesses Si—H groups and Si—R groups; and wherein the number of Si—H groups is greater than the number of Si—R groups, where R is selected from $C_1$ to $C_5$ alkyls.
9. The method of numbered embodiment 7, wherein the silicone hydride possesses Si—H groups and Si—R groups; and wherein the number of Si—H groups is at least twice the number of Si—R groups, where R is selected from $C_1$ to $C_5$ alkyls.
10. The method of any of the previous numbered embodiments, wherein the thermoplastic is selected from polypropylene comprising from 0 to 20 wt % of $C_2$ or $C_4$ to $C_{10}$ α-olefins, by weight of the polypropylene.
11. The method of any of the previous numbered embodiments, wherein the curable polymer is selected from ethylene-propylene rubber (EPM), ethylene-propylene-diene rubber (EPDM), natural rubber (polyisoprene), butyl rubber, halobutyl rubber, halogenated rubber copolymer of p-alkystyrene and at least one $C_4$-$C_7$ isomonoolefin, a copolymer of isobutylene and divinylbenzene, homopolymers of a conjugated $C_4$-$C_8$ diene, copolymers of at least one $C_4$-$C_8$ conjugated diene and a comonomer, unsaturated non-polar elastomers, polybutadiene elastomer, styrene-butadiene elastomer and mixtures thereof.
12. The method of any of the previous numbered embodiments, wherein the components are melt blended in the extruder in the range of from 180° C. to 290° C.
13. The method of any of the previous numbered embodiments, wherein the components are melt blended at a shear rate in the range of from 2000 to 8000 $s^{-1}$.
14. The method of any of the previous numbered embodiments, wherein extruder is a screw-type extruder having a length to diameter ratio in the range of from 50 to 5.
15. A curative composition comprising a silicone hydride having the formula

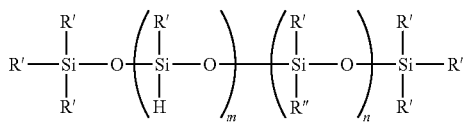

wherein H is hydrogen, and each R' is independently selected from hydrogen and $C_1$ to $C_{10}$ alkyl groups; R" is selected from $C_1$ to $C_{10}$ alkyl groups; n is an integer from 5 to 45; and m is an integer from 5 to 45.
16. The curative composition of numbered embodiment 15, and R' is selected from hydrogen and $C_1$ to $C_3$ alkyl groups; R" is selected from $C_1$ to $C_3$ alkyl groups; n is an integer from 5 to 30; and m is an integer from 5 to 30.
17. The curative composition of numbered embodiments 15 and 16, wherein m is an integer from 5 to 25; and n is 0.
18. The curative composition of any of numbered embodiments 15-17, wherein R' is selected from $C_1$ to $C_3$ alkyl groups; R" is selected from $C_1$ to $C_3$ alkyl groups; m is an integer from 12 to 30; and n is an integer from 2 to 18; with the proviso that m>n.
19. The curative composition of any of numbered embodiments 15-18, further comprising a metal catalyst selected from Group 9 to 12 metal compounds.
20. The curative composition of numbered embodiment 19, wherein the metal catalyst is selected from Group 10 metal compounds.
21. A method of curing a polymer composition comprising melt blending a curable rubber, a thermoplastic, and the curative composition of any of numbered embodiments 15-20.
22. The method of any of the previous numbered embodiments, wherein the components are melt blended in the extruder at from 180° C. to 290° C.
23. The method of any of the previous numbered embodiments, wherein the components are melt blended at a shear rate of from 2000 to 8000 $s^{-1}$.
24. The method of any of the previous numbered embodiments, wherein the length to diameter ratio of the extruder ranges from 50 to 5.

In another aspect is the use of a curative composition comprising a silicone hydride having the formula

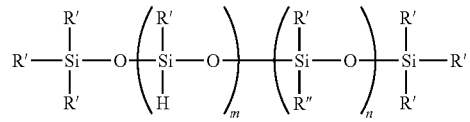

wherein H is hydrogen, and each R' is independently selected from hydrogen and $C_1$ to $C_{10}$ alkyl groups; R" is selected from $C_1$ to $C_{10}$ alkyl groups; n is an integer from 5 to 45; and m is an integer from 5 to 45. In one embodiment, the use of the curative composition is used for making a thermoplastic vulcanizate as described herein.

What is claimed is:
1. A method of melt blending comprising:
(a) providing a screw-type extruder possessing addition points from a zero point to a 100 point the length of the extruder, where the extruder has an L/D within the range of from 50 to 35 and an output within the range of from 60 to 80 kg/hr;
(b) adding at least one thermoplastic and ethylene-propylene-diene rubber at the zero to 10 point of the extruder, where the thermoplastic is selected from polypropylene comprising from 0 to 20 wt % of $C_2$ or $C_4$ to $C_{10}$ α-olefins, by weight of the polypropylene;
(c) melt blending the thermoplastic and the rubber at a temperature of from 180° C. to 290° C. and at a shear rate in the range of 2,000 to 8,000 $s^{-1}$;
(d) adding at least one silicone hydride at the 5 to 30 point of the extruder;
(e) adding at least one metal catalyst at the 20 to 60 point of the extruder, where the silicone hydride has the formula:

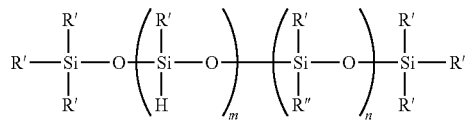

wherein H is hydrogen, and each R' is independently selected from $C_1$ to $C_3$ alkyl groups, R" is selected from $C_1$ to $C_3$ alkyl groups, n is 0 or 7, m is 17 with the proviso that the metal catalyst is added at least 5 points farther down the extruder than the silicone hydride; and (f) isolating a thermoplastic vulcanizate from the 90 to 100 point of the extruder.

2. The method of claim 1, wherein the metal catalyst is added at the 25 to 45 point of the extruder, and the silicone hydride is added at the 14 to 25 point of the extruder.

3. The method of claim 1, wherein the metal catalyst is added at the 45 to 55 point of the extruder, and the silicone hydride is added at the 20 to 30 point of the extruder.

4. The method of claim 1, wherein the metal catalyst is added at least 10 points farther down the extruder than the silicone hydride.

5. The method of claim 1, wherein the metal catalyst is selected from Group 9 to 12 metal compounds.

6. The method of claim 1, wherein the ethylene-propylene-diene rubber includes units deriving from 5-vinyl-2-norbornene.

7. A method of melt blending comprising:
(a) providing a screw-type extruder possessing addition points from a zero point to a 100 point the length of the extruder, where the extruder has an L/D of 42 and an output of 70 kg/hr;
(b) adding polypropylene homopolymer and ethylene-propylene-diene rubber at the zero to 10 point of the extruder, where the rubber includes units deriving from 5-vinyl-2-norbornene;
(c) melt blending the thermoplastic and the rubber at a temperature of from 180° C. to 290° C. and at a shear rate in the range of 2,000 to 8,000 $s^{-1}$;
(d) adding a silicone hydride at the 16 point of the extruder;
(e) adding at least one metal catalyst at the 33 point of the extruder, where the silicone hydride has the formula:

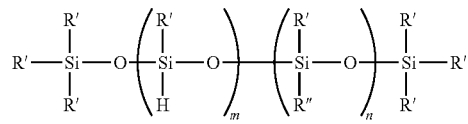

wherein H is hydrogen, and each R' is methyl, R" is methyl, n is 7, m is 17; and (f) isolating a thermoplastic vulcanizate from the 90 to 100 point of the extruder, to thereby produce a thermoplastic vulcanizate characterized by a color value L of at least 84.

8. A method of melt blending comprising:
(a) providing an extruder possessing addition points from a zero point to a 100 point the length of the extruder;
(b) adding at least one thermoplastic and ethylene-propylene-diene rubber at the zero to 10 point of the extruder;
(c) adding at least one silicone hydride at the 5 to 30 point of the extruder, where the silicone hydride has the formula:

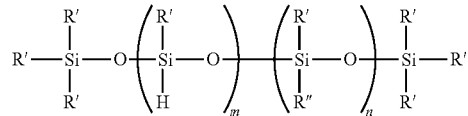

wherein H is hydrogen, and each R' is independently selected from hydrogen and $C_1$ to $C_3$ alkyl groups; R" is selected from $C_1$ to $C_3$ alkyl groups; n is 0 or 7; and m is 17;

(d) adding at least one metal catalyst at the 20 to 60 point of the extruder, with the proviso that the metal catalyst is added at least 5 points farther down the extruder than the silicone hydride; and (e) isolating a thermoplastic vulcanizate from the 90 to 100 point of the extruder.

9. The method of claim 8, wherein the ethylene-propylene-diene rubber includes units deriving from 5-vinyl-2-norbornene.

* * * * *